United States Patent
Ma et al.

(10) Patent No.: US 7,172,644 B2
(45) Date of Patent: Feb. 6, 2007

(54) METHOD FOR CURING DEFECTS IN THE FABRICATION OF A COMPOSITE GAS SEPARATION MODULE

(75) Inventors: Yi Hua Ma, Worcester, MA (US); Ivan P. Mardilovich, Worcester, MA (US); Erik E. Engwall, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 312 days.

(21) Appl. No.: 10/804,848

(22) Filed: Mar. 19, 2004

(65) Prior Publication Data
US 2004/0244583 A1 Dec. 9, 2004

Related U.S. Application Data

(60) Provisional application No. 60/456,931, filed on Mar. 21, 2003.

(51) Int. Cl.
*B01D 53/22* (2006.01)
*B01D 65/10* (2006.01)
*B01D 67/00* (2006.01)
*B01D 71/02* (2006.01)

(52) U.S. Cl. .......................... 95/56; 96/11; 55/DIG. 5; 427/245; 428/670

(58) Field of Classification Search ............ 95/55, 95/56; 96/4, 11; 55/DIG. 5; 427/245, 250, 427/405; 428/548, 670; 423/248, 648.1
See application file for complete search history.

(56) References Cited

U.S. PATENT DOCUMENTS 2,958,391 A 11/1960 deRosset (Continued)

FOREIGN PATENT DOCUMENTS

EP 1 277 512 A 1/2003

(Continued)

OTHER PUBLICATIONS

Gryaznov, V. M., "Metal Containing Membranes for the Production of Ultrapure Hydrogen and the Recovery of Hydrogen Isotopes," *Separation and Purification Methods* (now *Separation and Purification Reviews*), 29(2):171-187 (2000).

(Continued)

*Primary Examiner*—Frank M. Lawrence
(74) *Attorney, Agent, or Firm*—Hamilton, Brook, Smith & Reynolds, P.C.

(57) ABSTRACT

The present invention relates to a method for curing a defect in the fabrication of a composite gas separation module and to composite gas separation modules formed by a process that includes the method. The present invention also relates to a method for selectively separating hydrogen gas from a hydrogen gas-containing gaseous stream. The method for curing a defect in the fabrication of a composite gas separation module includes depositing a first material over a porous substrate, thereby forming a coated substrate, wherein the coated substrate contains at least one defect. Then, the coated substrate can be selectively surface activated proximate to the defect, thereby forming at least one selectively surface activated region of the coated substrate. A second material can be then preferentially deposited on the selectively surface activated region of the coated substrate, whereby the defect is cured.

48 Claims, 1 Drawing Sheet

U.S. PATENT DOCUMENTS

| | | |
|---|---|---|
| 3,413,777 A | 12/1968 | Langley et al. |
| 3,428,476 A | 2/1969 | Langley et al. |
| 4,056,373 A | 11/1977 | Rubin |
| 4,496,373 A | 1/1985 | Behr et al. |
| 4,589,891 A | 5/1986 | Iniotakis et al. |
| 4,699,637 A | 10/1987 | Iniotakis et al. |
| 4,857,080 A | 8/1989 | Baker et al. |
| 5,049,167 A | 9/1991 | Castro et al. |
| 5,139,541 A | 8/1992 | Edlund |
| 5,205,841 A | 4/1993 | Vaiman |
| 5,215,729 A | 6/1993 | Buxbaum |
| 5,217,506 A | 6/1993 | Edlund et al. |
| 5,258,339 A | 11/1993 | Ma et al. |
| 5,259,870 A | 11/1993 | Edlund |
| 5,358,553 A | 10/1994 | Najjar et al. |
| 5,393,325 A | 2/1995 | Edlund |
| 5,449,848 A | 9/1995 | Itoh |
| 5,451,386 A | 9/1995 | Collins et al. |
| 5,498,278 A | 3/1996 | Edlund |
| 5,614,001 A | 3/1997 | Kosaka et al. |
| 5,652,020 A | 7/1997 | Collins et al. |
| 5,672,388 A | 9/1997 | McHenry et al. |
| 5,738,708 A | 4/1998 | Peachey et al. |
| 5,782,959 A | 7/1998 | Yang et al. |
| 5,782,960 A | 7/1998 | Ogawa et al. |
| 5,904,754 A | 5/1999 | Juda et al. |
| 6,152,987 A | 11/2000 | Ma et al. |
| 6,152,995 A | 11/2000 | Edlund |
| 6,183,542 B1 | 2/2001 | Bossard |
| 6,267,801 B1 | 7/2001 | Baake et al. |
| 6,309,546 B1 | 10/2001 | Herrmann et al. |
| 6,372,363 B1 | 4/2002 | Krueger |
| 6,379,524 B1 | 4/2002 | Lee et al. |
| 6,419,728 B1 | 7/2002 | Edlund |
| 6,475,268 B2 | 11/2002 | Thornton |
| 6,547,858 B1 | 4/2003 | Edlund et al. |
| 6,596,057 B2 | 7/2003 | Edlund et al. |
| 6,730,145 B1 * | 5/2004 | Li .................................. 96/10 |
| 6,916,454 B2 | 7/2005 | Alvin |
| 6,964,697 B2 | 11/2005 | Pan et al. |
| 7,018,446 B2 | 3/2006 | Alvin et al. |
| 2002/0083829 A1 | 7/2002 | Edlund et al. |
| 2002/0164496 A1 | 11/2002 | Saloka et al. |
| 2003/0183080 A1 | 10/2003 | Mundschau |
| 2003/0190486 A1 | 10/2003 | Roa et al. |
| 2003/0213365 A1 | 11/2003 | Jantsch et al. |
| 2004/0037962 A1 * | 2/2004 | Uemura et al. ............. 427/378 |
| 2004/0244589 A1 | 12/2004 | Bossard et al. |
| 2005/0072304 A1 | 4/2005 | Etievant et al. |
| 2006/0188737 A1 | 8/2006 | Roa et al. |

FOREIGN PATENT DOCUMENTS

| | | |
|---|---|---|
| JP | 05-123548 A1 * | 5/1993 |
| JP | 10-028850 | 2/1998 |
| JP | 2000005580 A | 11/2000 |
| JP | 2003290636 A | 10/2003 |
| WO | WO 99/33545 | 7/1999 |
| WO | WO 03/011433 A1 | 2/2003 |
| WO | WO 2005/075060 | 8/2005 |

OTHER PUBLICATIONS

Gryaznov, V. M., et al., "Preparation and catalysis over Palladium Composite Membranes," *Applied Catalysis A: General*, 96:15-23 (1993).

Ma, Y. H., et al., "Characterization of Intermetallic Diffusion Barrier and Alloy Formation for Pd/Cu and Pd/Ag Porous Stainless Steel Composite Membranes," *I & EC Research*, 43:2936-2945 (2004).

Ma, Y. H., et al., "Thin Composite Palladium and Palladium/Alloy Membranes for Hydrogen Separation," *Ann. N.Y. Acad. Sci.*, 984:346 (2003).

Mardilovich, I.P., et al., "Dependence of Hydrogen Flux on The Pore Size and Plating Surface Topology of Asymmetric Pd-Porous Stainless Steel Membranes," *Desalination*, 144:85-89 (2002).

Nam, S.-E., et al., "Hydrogen Separation by Pd Alloy Composite Membranes," *J. Membrane Sci.*, 192:177-185 (2001).

Ozaki, T., et al., "Preparation of Palladium-coated V and V-15 Ni Membranes for Hydrogen Purification by Electroless Plating Technique," *Int. J. Hydrogen Energy*, 28:297 (2003).

Roa, F., "Preparation and Characterization of Pd-Cu Composite Membranes for Hydrogen Separation," *Chem. Eng. J.*, 93:11 (2003).

Roa, F., et al., "The Influence of Alloy Composition on The $H_2$ Flux of Composite Pd-Cu Membranes," *Desalination*, 147:411-416 (2002).

Shu, J., et al., "Structurally Stable Pd-Ag Alloy Membranes: Introduction of a Diffusion Barrier," *Thin Solid Films*, 286:72-79 (1996).

U.S. Appl. No. 10/804,846, by Yi Hua Ma, Ivan P. Mardilovich and Erik E. Engwall, filed Mar. 19, 2004.

U.S. Appl. No. 10/804,847, by Yi Hua Ma, Ivan P. Mardilovich and Erik E. Engwall, filed Mar. 19, 2004.

U.S. Appl. No. 10/836,088, by Yi Hua Ma, Ivan P. Mardilovich and Erik E. Engwall, filed Apr. 30, 2004.

* cited by examiner

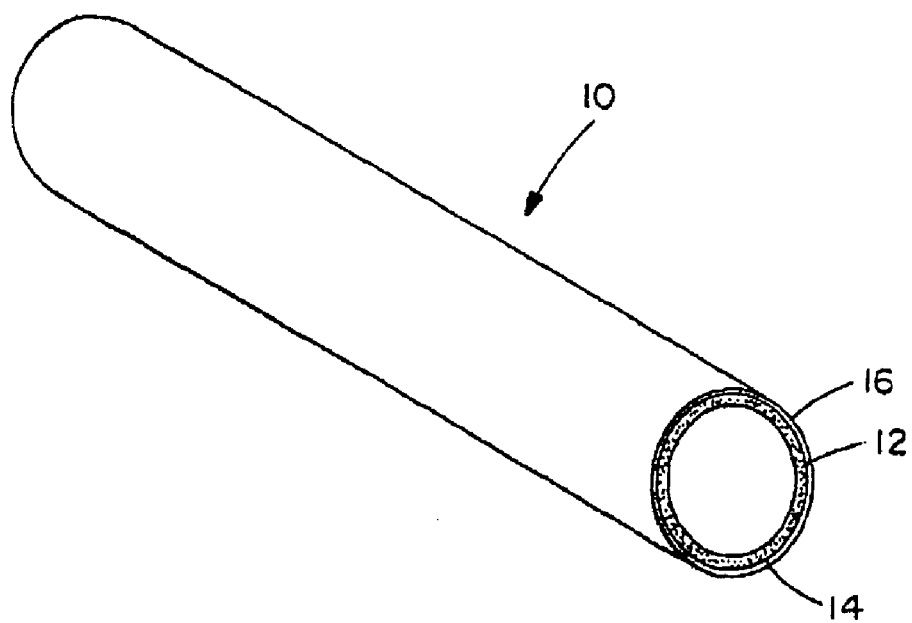

METHOD FOR CURING DEFECTS IN THE FABRICATION OF A COMPOSITE GAS SEPARATION MODULE

RELATED APPLICATION

This application claims the benefit of U.S. Provisional Application No. 60/456,931, filed on Mar. 21, 2003. The entire teachings of the above application are incorporated herein by reference.

BACKGROUND OF THE INVENTION

Gas separation modules are commonly used to selectively separate a particular gas from a gas mixture. Two of the most common gas separation modules are polymer membranes and metallic composites. Polymer membranes can provide an effective and cost-efficient option for separating a gas at low temperatures. Where separations must be performed in conjunction with high-temperature processing, however, polymer membranes are generally unsuitable because they tend to thermally decompose.

The development of high-temperature processing, along with tighter environmental regulations, requires utilization of gas separation modules that provide high flux, high selectivity of separation, and the ability to operate at elevated temperatures. Instead of polymers, metallic composite modules can be employed to serve these needs. A composite gas separation module can consist of a metallic membrane having selective gas permeability mounted on a porous substrate. Alternatively, a gas separation module can be formed purely of a hydrogen-selective metal such as palladium. However, such a module can be very expensive to produce and can lack the mechanical strength that can be required for high pressure and/or high temperature applications.

An area of high-temperature gas separation that is of particular interest is the separation and purification of hydrogen gas from a reaction gas mixture. A composite module for selectively separating hydrogen gas at high temperatures can include a palladium (Pd) membrane. Ideally, the palladium membrane is permeable to hydrogen but not to other gases. When hydrogen gas ($H_2$) contacts the membrane, the hydrogen molecules dissociate and hydrogen atoms diffuse into the membrane. Accordingly, hydrogen can selectively pass from a surrounding atmosphere through the palladium membrane. The selectively separated hydrogen atoms then reassociate into $H_2$ gas and pass into a volume on the opposite side of the module.

Typical hydrogen-selective metal membranes used in composite gas separation modules must be free of defects and/or pinholes that breach the metal layer to prevent the migration of undesired gases through the metal membrane. However, thick gas-selective metal membranes, e.g., palladium membranes, generally are very expensive. In addition, the use of thick membranes to separate gas mixtures usually results in low fluxes of gas(es).

Therefore, a need exists for composite gas separation modules (and methods for their fabrication) that overcome or minimize the above-referenced problems.

SUMMARY OF THE INVENTION

The present invention relates to a method for curing a defect in the fabrication of a composite gas separation module and to composite gas separation modules formed by a process that includes the method. The present invention also relates to a method for selectively separating hydrogen gas from a hydrogen gas-containing gaseous stream.

The method for curing a defect in the fabrication of a composite gas separation module includes depositing a first material over a porous substrate, thereby forming a coated substrate, wherein the coated substrate contains at least one defect. Then, the coated substrate can be selectively surface activated proximate to the defect, thereby forming at least one selectively surface activated region of the coated substrate. A second material can be then preferentially deposited on the selectively surface activated region of the coated substrate, whereby the defect is cured.

The defect can include, for example, a pore, hole, crack or other physical condition that impairs the gas-selectivity of the composite gas separation module. The defect can include a region that is permeable to an inert gas such as helium. In one embodiment, for example, the defect includes a pore of the porous substrate that is not covered or obstructed by depositing the first material over the porous substrate. The first material, the second material or both the first material and the second material can include a gas-selective material. For example, the gas-selective material can include a hydrogen-selective metal, e.g., palladium, or an alloy thereof.

The present invention also includes the composite gas separation module fabricated by a process that includes a method for curing a defect in the fabrication of a composite gas separation module, wherein the method includes depositing a first material over a porous substrate, thereby forming a coated substrate, wherein the coated substrate contains at least one defect; selectively surface activating the coated substrate proximate to the defect, thereby forming at least one selectively surface activated region of the coated substrate; and preferentially depositing a second material on the selectively surface activated region of the coated substrate, whereby the defect is cured.

In one aspect, the invention relates to a method for selectively separating hydrogen gas from a hydrogen gas-containing gaseous stream. This method includes directing the hydrogen gas-containing gaseous stream to a composite gas separation module formed by a process that includes the method for curing a defect in the fabrication of a composite gas separation module, described supra. By this method, hydrogen gas is at least partially partitioned from the gaseous stream by passing through a dense hydrogen-selective membrane. The dense hydrogen-selective metal membrane can be formed of, for example, palladium or an alloy thereof.

The present invention also includes a method for fabricating a plated substrate. The method includes plating a first metal over a porous substrate, thereby forming a coated substrate, wherein the coated substrate contains at least one defect. Then, the coated substrate can be selectively surface activated proximate to the defect, thereby forming at least one selectively surface activated region of the coated substrate. A second metal can be then preferentially plated on the selectively surface activated region of the coated substrate, thereby forming the plated substrate. The defect can include for example, a pore, hole, crack or other physical condition that allows a fluid to pass through the plated substrate. In one embodiment, the plated substrate is a component of a gas separation system.

Practice of the present invention results in the curing of one or more defects in the fabrication of a composite gas separation module. For example, a defect can be cured, e.g., covered or obstructed, by preferentially depositing a second material on the selectively surface activated region of the coated substrate. By preferentially depositing a second material (e.g., a gas-selective metal) on the selectively surface activated region of the coated substrate, a substantially defect-free composite gas separation module can be formed using less of the first material and/or the second material than would be needed if the present invention were not practiced.

The present invention can be practiced to fabricate composite gas separation modules that contain generally thinner and/or more uniform dense gas-selective membranes than composite gas separation modules fabricated using conventional techniques. For example, composite gas separation modules fabricated in accordance with the present invention can have more uniform deposits of gas-selective materials over the substrate and thus can have fewer regions over the substrate in which the gas-selective material is thicker than would otherwise be required to form a dense gas-selective membrane.

Thus, the methods described herein can be used to fabricate composite gas separation modules that contain smaller quantities of gas-selective material such as expensive hydrogen-selective metals and alloys thereof. In addition, fabrication of composite gas separation modules that have thinner dense gas-selective membranes can simplify manufacturing by reducing the number of layers of gas-selective material that must be deposited over the porous substrate. Therefore, practice of the present invention can reduce manufacturing costs, e.g., material, labor and capital costs, for fabricating composite gas separation modules as compared to conventional techniques.

In addition, since thinner dense gas-selective membranes typically produce higher rates of gas flux during a separation operation, composite gas separation modules fabricated as described herein can produce higher overall rates of gas flux, e.g., hydrogen flux. Thus, gas separation processes utilizing the composite gas separation modules described herein can achieve higher rates of gas separation than is possible using conventional composite gas separation modules employing thicker or less uniform dense gas-selective membranes.

Furthermore, the composite gas separation modules containing dense gas-selective membranes described herein can be more thermally stable than conventional composite gas separation modules having dense gas-selective membranes. For example, during a gas separation operation, the composite gas separation modules described herein can maintain substantially constant flux of a desired gas (e.g., hydrogen gas) even at high operating temperatures. In some embodiments, the composite gas separation modules described herein can maintain substantially constant flux of the desired gas for extended periods of time, for example, for hundreds or thousands of hours of operation at high temperatures.

BRIEF DESCRIPTION OF THE DRAWINGS

The FIGURE is a sectional perspective view of a composite gas separation module as one embodiment of the present invention.

DETAILED DESCRIPTION OF THE INVENTION

The features and other details of the method of the invention will now be more particularly described with reference to the accompanying drawing and pointed out in the claims. It will be understood that the particular embodiments of the invention are shown by way of illustration and not as limitations of the invention. The principal features of this invention can be employed in various embodiments without departing from the scope of the invention.

In one embodiment, the invention includes a method for curing a defect in the fabrication of a composite gas separation module, comprising the steps of: (a) depositing a first material over a porous substrate, thereby forming a coated substrate, wherein the coated substrate contains at least one defect; (b) selectively surface activating the coated substrate proximate to the defect, thereby forming at least one selectively surface activated region of the coated substrate; and (c) preferentially depositing a second material on the selectively surface activated region of the coated substrate, whereby the defect is cured. The first material, the second material, or both the first material and the second material can include a gas-selective material. For example, the gas-selective material can include a hydrogen-selective metal, e.g., palladium, or an alloy thereof.

The present invention also relates to a composite gas separation module fabricated by a process that includes this method for curing a defect. Practice of the present invention can produce composite gas separation modules having thinner and/or more uniformly thick dense gas-selective membranes than conventional processes for fabricating composite gas separation modules.

The composite gas separation modules described herein each include a dense gas-selective membrane such as, for example, a dense hydrogen-selective metal membrane. In one embodiment, the composite gas separation module includes a dense hydrogen-selective metal membrane of palladium or an alloy thereof. A "dense gas-selective membrane," as that term is used herein, refers to a component of a composite gas separation module that has one or more layers of a gas-selective material, i.e., a material that is selectively permeable to a gas, and that is not materially breached by regions or points which impair the separation of the gas by allowing the passage of an undesired gas. For instance, in one embodiment, the dense gas-selective membrane is not materially breached by regions or points which do not have the desired gas selectivity properties of the gas-selective material. An example of a dense gas-selective membrane is a dense hydrogen-selective metal membrane of palladium, or an alloy thereof, that is substantially free of defects. Defects can include, for example, pores, holes, cracks or other physical conditions that impair the gas-selectivity of the composite gas separation module by allowing the passage of an undesired gas.

The term "support," as used herein, includes a substrate, a surface treated substrate, a coated substrate, or a coated substrate containing at least one cured defect upon which a dense gas-selective membrane has been or will be formed. Serving as a support structure, the substrate can enhance the durability and strength of the composite gas separation module.

The side of the support upon which the dense gas-selective membrane is formed is referred to herein as the "outside" or "membrane-side" and the opposite side of the support is called the "inside" or "substrate-side" surface. However, it should be noted that the dense gas-selective membrane can be formed on the exterior surface and/or the interior surface of the substrate. For example, the dense gas-selective membrane can be formed on either or both surfaces of a planar substrate or can be formed on the exterior and/or interior surfaces of a substrate tube. Preferably, the dense gas-selective membrane is formed on only one surface of the substrate, for example, on either the exterior or the interior surface of a substrate tube.

"Gas-selective material," as used herein, refers to those materials which, when formed into dense gas-selective membranes, allow the passage of a select gas, or select gases, through the dense gas-selective membrane. Suitable gas-selective materials include metals, ceramics (e.g., perovskite and perovskite-like materials) and zeolites (e.g., MFI and Zeolites A, X, etc.). In one embodiment, the gas-selective material is a hydrogen-selective metal such as palladium or an alloy thereof. Examples of suitable palladium alloys include palladium alloyed with at least one of the metals selected from the group consisting of copper, silver, gold, platinum, ruthenium, rhodium, yttrium, cerium and indium. For example, palladium/silver and palladium/copper alloys can be used to form dense hydrogen-selective membranes. In one embodiment, the gas-selective material is a ceramic such as oxygen gas-selective perovskite.

In one embodiment, the gas-selective material can include a combination of substances. For example, the invention includes the step of depositing a hydrogen-selective metal and a zeolite over the porous substrate, thereby forming the coated substrate. In one embodiment, the zeolite or other material used in a combination of substances is gas-selective. In an alternative embodiment, the zeolite or other material used in a combination of substances is not gas-selective, for example, the zeolite used in a combination of substances is not hydrogen-selective. The methods described herein also can include preferentially depositing a combination of materials on the selectively surface activated region of the coated substrate.

Specific embodiments of the invention, including the method for curing a defect in the fabricating of a composite gas separation module, the composite gas separation module formed by a process that includes this method, the method for selectively separating hydrogen gas from a hydrogen gas-containing gaseous stream, and the method for fabricating a plated substrate follow. Details of method steps employed in various embodiments of the methods for fabrication of a composite gas separation module, and of optional components of the resulting composite gas separation modules, are described thereafter under separate subheadings.

The FIGURE illustrates cylindrical composite gas separation module 10 as one embodiment of the invention. Composite gas separation module 10 includes porous substrate 12, optional intermediate layer 14, and dense gas-selective membrane 16. As illustrated, intermediate layer 14 and dense gas-selective membrane 16 overlie the outside surface of cylindrical porous substrate 12. In alternative embodiments not illustrated, intermediate layer 14 and dense gas-selective membrane 16 can overlie the interior surface of cylindrical porous substrate 12 (with the dense gas-selective membrane forming the innermost of the three cylindrical layers) or can overlie both the interior and the exterior surfaces of porous substrate 12. In a preferred embodiment, intermediate layer 14 and dense gas-selective membrane 16 overlie only either the interior or the exterior surface of porous substrate 12. The composite gas separation module can take any of a variety of forms including a cylindrical tube, as illustrated in the FIGURE, or a planar surface.

The present method for curing a defect in the fabrication of a composite gas separation module includes the step of depositing a first material over a porous substrate, thereby forming a coated substrate. The coated substrate thus formed contains at least one defect.

The porous substrate can be formed from any of a variety of components known to those of ordinary skill in the art. Examples of suitable substrate components include, but are not limited to, iron, nickel, titanium, chromium, aluminum, and alloys thereof, e.g., steel, stainless steel, HASTEL-LOY® alloys (e.g., HASTELLOY® C-22®) (trademarks of Haynes International, Inc., Kokomo, Ind.) and INCONEL® alloys (e.g., INCONEL® alloy 625) (INCONEL is a trademark of Huntington Alloys Corp., Huntington W. Va.); and ceramics. In one embodiment, the porous metal substrate is an alloy containing chromium and nickel. In an additional embodiment, the alloy contains chromium, nickel and molybdenum such as, for example, HASTELLOY® C-22® or INCONEL® alloy 625. Preferably, the substrate is a porous metal substrate such as, for example, porous stainless steel. Cylinders of porous stainless steel that are suitable for use as substrates are available from Mott Metallurgical Corporation (Farmington, Conn.) and from Pall Corporation (East Hills, N.Y.), for example.

One of ordinary skill in the art can select substrate thickness, porosity, and pore size distribution using techniques known in the art. Desired substrate thickness, porosity, and pore size distribution can be selected based on, among other factors, the operating conditions of the final composite gas separation module such as operating pressure. Substrates having generally higher porosities and generally smaller pore sizes are particularly suited for producing composite gas separation modules. In some embodiments, the substrate can have a porosity in a range of about 5 to about 75% or about 15 to about 50%. While the pore size distribution of a substrate can vary, the substrate can have pore diameters that range from about 0.1 microns or less to about 15 microns or more. Generally, smaller pore sizes are preferred. In some embodiments, the mean or median pore size of the substrate can be about 0.1 to about 15 microns, e.g., from about 0.1 to about 1, 3, 5, 7 or about 10 microns. For example, the substrate can be an about 0.1 micron grade substrate to an about 0.5 micron grade substrate, e.g., 0.1 micron, 0.2 micron, and 0.5 micron grades of stainless steel substrates can be used. In one embodiment, the substrate is 0.1 micron grade HASTELLOY® alloy.

In a preferred fabrication method, any contaminants are initially cleaned from the substrate, for example, by treating the substrate with an alkaline solution such as by soaking the substrate in an approximately 60° C. ultrasonic bath for about half an hour. Cleaning is typically followed by rinsing such as, for example, wherein the substrate is sequentially rinsed in tap water, deionized water and isopropanol. Preparation of the porous substrate can also include surface treatment; formation of an intermetallic diffusion barrier; surface activation; and/or deposition of a metal such as palladium, platinum, or gold, as described infra, prior to depositing the first material, e.g., a gas->selective material, on the porous substrate.

"Surface activation," "general surface activation" and "selective surface activation," as used herein, include deposition of one or more materials on a surface to encourage deposition of one or more subsequently applied materials. In one embodiment, metal nuclei, such as palladium nuclei, are deposited on a surface to encourage deposition of subsequently applied material (e.g., the first or second materials). For example, a liquid activation composition, described infra, can be used to deposit metal nuclei on a surface.

"General surface activation" includes, for example, depositing metal nuclei on a surface in a diffuse or comprehensive manner. For example, "general surface activation" can include depositing metal nuclei over the entire membrane-side of a support or over the entire surface of a porous substrate or a surface treated substrate. "Selective surface activation" includes, for example, depositing metal nuclei on a surface in a targeted or tailored manner. For example, in one embodiment, selectively surface activating the coated substrate proximate to the defect includes depositing metal nuclei proximate to the defect (e.g., within the defect) but not generally over the membrane-side of the support.

In one aspect of the present invention, a first material is deposited over the porous substrate, thereby forming a coated substrate, wherein the coated substrate contains at least one defect. For example, a gas-selective material can be deposited to form a thin layer of the gas-selective material. In one embodiment, the first material includes a gas-selective material, for example, a hydrogen-selective metal or an alloy thereof such as palladium or an alloy thereof. In some embodiments, the first material does not include a gas-selective material or a hydrogen-selective metal. In one embodiment, the first material includes a zeolite.

The first material can include a combination of components. In one embodiment, the first material includes a first component and a second component and the step of depositing the first material over the porous substrate includes the steps of: (a) depositing the first component over the porous substrate, thereby forming a first component-coated substrate, wherein the first component-coated substrate contains at least one defect; (b) selectively surface activating the first component-coated substrate proximate to the defect, thereby forming at least one selectively surface activated region of the first component-coated substrate; and (c) preferentially depositing the second component on the selectively surface activated region of the first component-coated substrate. In another embodiment, the first material further includes a third component and the method further includes the step of depositing the third component over the second component, thereby forming the coated substrate.

In one embodiment, a gas-selective component of the first material (e.g., a hydrogen-selective metal) can be deposited over another component of the first material that is not gas-selective (e.g., not hydrogen-selective) prior to selectively surface activating the coated substrate proximate to the defect. In another embodiment, a component of the first material that is not gas-selective (e.g., not hydrogen-selective) can be deposited over a gas-selective component of the first material (e.g., a hydrogen-selective metal) prior to selectively surface activating the coated substrate proximate to the defect. In one embodiment, at least one of the components of the first material (e.g., the first, second, third or another component) is gas-selective. In yet another embodiment, all of the components of the first material (e.g., the first, second, third and other components) are gas-selective.

The invention further can include the step of depositing one or more other materials (e.g., gas-selective materials) on the porous substrate prior to depositing the first material over the porous substrate. For example, one or more ceramics, zeolites, metals and/or alloys can be deposited over the porous substrate before the first material is deposited over porous substrate.

The first material can be deposited over the porous substrate using any of the techniques known in the art. For example, the first material can be deposited using electroless plating, thermal deposition, chemical vapor deposition, electroplating, spray deposition, sputter coating, e-beam evaporation, ion beam evaporation or spray pyrolysis. In one embodiment, depositing the first material over the porous substrate includes depositing an alloy over the porous substrate. Depositing an alloy over the porous substrate can include applying at least two metals over the porous substrate and thermally treating the metals to form the alloy. For example, palladium and at least one of the metals selected from the group consisting of copper, silver, gold, platinum, ruthenium, rhodium, yttrium, cerium and indium can be deposited over the porous substrate and the metals can be thermally treated to form the alloy.

Depositing a first material over the porous substrate can begin the formation of a dense gas-selective membrane. A portion of defects (e.g., pores) present in the substrate can be obstructed or covered by depositing the first material (e.g., a gas-selective material) over the porous substrate. For example, in one embodiment, the smallest pores of the substrate are obstructed or covered by depositing the first material over the porous substrate, thereby forming the coated substrate. However, deposition of the first material can be stopped at a point when the coated substrate still contains at least one defect, e.g., prior to achieving a dense gas-selective membrane.

In one embodiment, the first material can be deposited over the porous substrate in an amount sufficient to impede (e.g., substantially prevent) flow of a liquid activation composition from a first side of the coated substrate to a second side of the coated substrate. For example, the first material can be deposited over the porous substrate in an amount sufficient to substantially prevent emergence of the liquid activation composition, applied from the first side of the coated substrate, from the defect and onto the second side of the coated substrate. In some embodiments, at least about 50, 60, 70, or at least about 80 percent, e.g., about 90 to about 95 percent, of the pores present in the porous substrate are covered and/or blocked by deposition of the first material.

The quantity of the first material necessary to impede flow of a liquid activation composition from a first side of the coated substrate to a second side of the coated substrate can vary depending on the size of the pores present in the porous substrate. In one embodiment, the first material is deposited to produce a total thickness of material (e.g., zeolite, ceramic and/or metal) on the porous substrate that is less than about 80 percent of the ultimate thickness of the dense gas selective membrane. In some embodiments, the first material is deposited to produce a total thickness of material on the porous substrate that is less than about 60, 50, 40, 30 or less than about 20 percent of the ultimate thickness of the dense gas selective membrane. For example, the first material can be deposited to produce a total thickness of material on the porous substrate that is about 10 to about 60, about 20 to about 50, or about 30 to about 40 percent of the ultimate thickness of the dense gas selective membrane.

The inventive method for curing a defect in the fabrication of a composite gas separation module also includes the step of selectively surface activating the coated substrate proximate to the defect, thereby forming at least one selectively surface activated region of the coated substrate. In one aspect of the method, the defect includes a pore and selectively surface activating the coated substrate proximate to the defect includes selectively surface activating the pore.

The step of selectively surface activating the coated substrate proximate to the defect can include selectively seeding the coated substrate proximate to the defect with nuclei of a metal, e.g., a gas-selective metal such as palladium. In one embodiment, a liquid activation composition can be used to selectively seed the coated substrate proximate to the defect with nuclei of a gas-selective metal, e.g., a gas-selective metal such as palladium.

Suitable liquid activation compositions can be selected by one of ordinary skill in the art. Examples of suitable liquid activation compositions include the liquid activation compositions described for use in surface activation, infra. For example, sequential applications of aqueous stannous chloride ($SnCl_2$) solution (e.g., about 1 g/L aqueous $SnCl_2$) and aqueous palladium chloride ($PdCl_2$) solution (e.g., about 0.1 g/L aqueous $PdCl_2$) are suitable for selectively activating the coated substrate. The liquid activation compositions can be used for selectively activating the coated substrate under conditions similar to those employed in general surface activation, described infra.

In one embodiment, the porous substrate has a first side and a second side and selectively surface activating the coated substrate proximate to the defect includes surface activating the coated substrate from the first side of the porous substrate (e.g., from the substrate-side of the coated substrate). For example, the liquid activation composition can be applied only to the substrate-side of the coated substrate, thereby selectively activating the defect while not substantially surface activating the membrane-side of the coated substrate.

For example, the coated substrate can be selectively surface activated by first applying an aqueous $SnCl_2$ solution to the substrate-side of the support. Then, the $SnCl_2$ solution is then removed, the support is rinsed, and an aqueous $PdCl_2$ solution is applied to the substrate-side of the support. The support can be then rinsed first with hydrochloric acid and then with water. Preferably, flow of the liquid activation compositions from the substrate-side of the coated substrate to the membrane-side of the coated substrate is impeded (e.g., substantially prevented) by deposits of the first material over the porous substrate. In one embodiment, the first material has been deposited over the porous substrate in an amount sufficient to substantially prevent flow of the liquid activation compositions from the substrate-side of the coated substrate to the membrane-side of the coated substrate. Preferably, the liquid activation compositions flow from the substrate-side of the coated substrate into the defect.

As a result of the selective surface activation of the coated substrate proximate to the defect, the defect can become selectively surface activated, e.g., seeded with palladium nuclei, and the membrane-side of the coated substrate can remain substantially or completely not surface activated. Advantageously, using the methods described herein, the defect can be selectively surface activated at and/or near defect openings on the membrane-side surface of the coated substrate.

In an alternative embodiment, a porous support, uncoated with a gas-selective material and having pores sufficiently small to impede flow of a liquid activation composition from a first side of the porous support to a second side of the porous support, is selectively activated proximate to the pores. Subsequently, a material such as a gas selective material can be deposited on the selectively surface activated porous substrate, thereby obstructing or covering the pores.

The inventive method for curing a defect in the fabrication of a composite gas separation module also includes the step of preferentially depositing a second material on the selectively surface activated region of the coated substrate, whereby the defect is cured. In one embodiment, the second material is a gas-selective material such as a hydrogen-selective metal, e.g., palladium, or an alloy thereof. The second material can include a combination of materials such as, for example, a combination of metals or a combination of a metal and a gas-selective material.

Preferentially depositing a second material on the selectively surface activated region of the coated substrate can include plating the selectively surface activated region with palladium or an alloy thereof. The second material can be deposited on the selectively surface activated region using any of the techniques known in the art for preferentially depositing a material on a selectively surface activated region. For example, the second material can be deposited using electroless plating or electroplating. In a preferred embodiment, electroless plating is used to deposit a metal onto the selectively surface activated region. Several suitable methods for depositing a metal, such as palladium, onto a support are described herein.

By preferentially depositing a second material on the selectively surface activated region of the coated substrate, the second material can be deposited on the substrate proximate to the defect. Deposition of the second material proximate to the defect can cure the defect, for example, by obstructing or covering the defect with the second material. Preferential deposition of the second material proximate to the defect, e.g., in and/or near the defect, can cause the defect to be narrowed and/or completely obstructed or covered. In one embodiment, the defect is cured after one step of preferential deposition of the second material proximate to the defect. In another embodiment, the defect is only partially cured after one step of preferential deposition of the second material proximate to the defect. For example, several steps of preferential deposition of the second material can be needed to completely cure the defect. In one embodiment, complete curing of a defect can include selectively surface activating the support again and preferentially depositing a third material (e.g., the second material such as a gas-selective metal).

In one embodiment, the porous substrate has a first side (e.g., the substrate-side) and a second side (e.g., the membrane-side) and preferentially depositing the second material on the selectively surface activated region of the coated substrate includes depositing the second material on the selectively surface activated region from the second side (e.g., the membrane-side) of the porous substrate. For example, the second material can be preferentially deposited on the selectively surface activated region by applying an electroless plating solution to the membrane-side of the porous substrate.

In some embodiments, preferential deposition of the second material on the selectively surface activated region can also result in some deposition of the second material on a region of the coated substrate that is not selectively surface activated. Preferably, the second material is preferentially deposited on the selectively surface activated region versus being deposited over the region of the coated substrate that is not selectively surface activated. For example, preferably a majority of the second material is deposited on the selectively surface activated region. In some embodiments, most of the second material is deposited on the selectively surface activated region. For example, at least about 60, 70, 80, 90, or at least about 95 weight percent of the second material can be deposited on the selectively surface activated region.

In one embodiment, the defect is cured by obstructing or covering the defect to prevent substantial flux of an undesired gas through the dense gas-selective membrane at the locality of the defect during operation of the composite gas separation module. In various embodiments, a portion, a majority, substantially all or all of the defects existing in the coated substrate are cured. One of ordinary skill in the art can determine a flux of an undesired gas that can be tolerated depending on the application for which the composite gas separation module is to be used and thus can determine a quantity of defects that can be tolerated in the composite gas-separation module. Therefore, in some embodiments, a composite gas separation module produced as described herein may contain one or more defects and remain suitable for gas-separation operations.

The method can include forming a dense gas-selective membrane over the porous substrate. In one embodiment a gas-selective material, e.g., palladium or an alloy thereof, is deposited over the coated substrate that contains at least one defect that has been cured as described herein, thereby forming a dense gas-selective membrane. For example, a gas-selective material can be deposited over the membrane-side, the substrate-side or both sides of the coated substrate that contains a defect cured as described herein. In another embodiment, by curing the defect in the coated substrate, the dense gas-selective membrane is formed.

In one embodiment, the dense gas-selective membrane is selectively permeable to hydrogen, e.g., the dense gas-selective membrane is a dense hydrogen-selective metal membrane and can include one or more hydrogen-selective metals or alloys thereof. "Hydrogen-selective metals" include, but are not limited to, niobium (Nb), tantalum (Ta), vanadium (V), palladium (Pd), zirconium (Zr) and hydrogen-selective alloys thereof. Palladium and alloys of palladium are preferred. For example, palladium can be alloyed with at least one of the metals selected from the group consisting of copper, silver, gold, platinum, ruthenium, rhodium, yttrium, cerium and indium.

Where the composite gas separation module is to be used at temperatures below about 300° C., the dense gas-selective membrane can be formed of a palladium alloy such as, for example, an alloy of about 75 to about 77 weight percent palladium and about 25 to about 23 weight percent silver. An alloy is typically preferred at low temperatures because pure palladium can undergo a phase change in the presence of hydrogen at or below about 300° C. and this phase change can lead to embrittlement and cracking of the membrane after repeated cycling in the presence of hydrogen. In one embodiment, a palladium/silver alloy is formed by first depositing palladium over the substrate by electroless deposition and then depositing silver, also by electroless deposition, over the substrate. An alloy membrane layer can then be formed by heating the silver and palladium layers, for example, to about 500° C. to about 1000° C. in an inert or hydrogen atmosphere. In one embodiment, metal components can be co-deposited over the substrate to form a layer of a finely divided mixture of small pockets of the pure metal components. In another embodiment, a technique such as sputtering or chemical vapor deposition is used to simultaneously deposit two or more metals to form an alloy layer over the substrate.

The present invention also includes a method for fabricating a plated substrate, comprising the steps of: (a) plating a first metal over a porous substrate, thereby forming a coated substrate, wherein the coated substrate contains at least one defect; (b) selectively surface activating the coated substrate proximate to the defect, thereby forming at least one selectively surface activated region of the coated substrate; and (c) preferentially plating a second metal on the selectively surface activated region of the coated substrate, thereby forming the plated substrate.

The defect can include, for example, a pore, hole, crack or other physical condition that allows a fluid to pass through the plated substrate. The techniques described herein for curing a defect in the fabrication of a composite gas separation module can also be applied to this method for fabricating a plated substrate. The step of selectively surface activating the coated substrate proximate to the defect can include seeding the coated substrate proximate to the defect with nuclei of a gas-selective metal, for example, using a liquid activation composition. In one embodiment, the first metal is deposited over the porous substrate in an amount sufficient to substantially prevent flow of a liquid activation composition from a first side of the coated substrate to a second side of the coated substrate. For example, selectively surface activating the coated substrate proximate to the defect can include surface activating the coated substrate proximate to the defect from the first side of the porous substrate, and preferentially depositing the second metal on the selectively surface activated region of the coated substrate can include depositing the second metal on the selectively surface activated region from the second side of the porous substrate. In one embodiment, preferentially depositing the second metal on the selectively surface activated region of the coated substrate can include depositing the second metal by electroless plating.

In one embodiment, at least one of the first metal and the second metal includes a hydrogen-selective metal or an alloy thereof such as palladium or an alloy thereof. Both the first metal and the second metal can include a hydrogen-selective metal or an alloy thereof. The hydrogen-selective metal(s) can include palladium alloyed with at least one of the metals selected from the group consisting of copper, silver, gold, platinum, ruthenium, rhodium, yttrium, cerium and indium. In one embodiment, the plated substrate includes a dense hydrogen-selective metal membrane, e.g., preferentially plating a second metal on the selectively surface activated region of the coated substrate produces a dense hydrogen-selective metal membrane. Thus, in one embodiment, the plated substrate can be a component of a gas separation system.

The invention also includes composite gas separation modules fabricated by a process that includes the method for curing a defect described supra. In one embodiment, the composite gas separation module includes a dense gas-selective membrane wherein the dense gas-selective membrane is less than about three times the diameter of the largest pore of the porous substrate. For example, the thickness of the dense gas-selective membrane can be less than about 2.5, 2, or less than about 1.5 times the diameter of the largest pore of the porous substrate. While the thickness of the dense gas-selective membrane can depend, among other factors, on the size of the largest pores in the porous substrate, in some embodiments the dense gas-selective membrane is less than about 30, 25, 20, 15, 12 or less than about 10 microns in thickness. For example, in one embodiment, the thickness of the dense gas-selective membrane is less than about 14 microns such as about 3 to 14 microns. In one particular embodiment, the dense gas-selective membrane is of substantially uniform thickness.

The composite gas separation modules described herein can further include an intermetallic diffusion barrier, as described infra, wherein the intermetallic diffusion barrier underlies the dense gas-selective membrane and overlies the porous substrate. For example, the intermetallic diffusion barrier can include alternating layers of palladium or an alloy thereof and layers of a Group IB metal, such as silver or copper, or an alloy thereof. The composite gas separation modules can also further include a surface treatment, also described infra, such as a ceramic coating bonded to the porous substrate and underlying the dense gas-selective membrane.

In one aspect, performance of the composite gas separation modules described herein can be assessed by measuring hydrogen flux through the module during operation. For example, hydrogen flux through the composite gas separation modules, in one embodiment, is at least about 4 $Nm^3/m^2$-hr at about 350° C. and with a hydrogen partial pressure difference of about 1 bar.

In one aspect, the present invention includes a method for selectively separating hydrogen gas from a hydrogen gas-containing gaseous stream. The method comprises the step of directing the hydrogen gas-containing gaseous stream to a composite gas separation module formed by a process that includes the method for curing a defect in the fabrication of a composite gas separation module, described supra. For example, the method for curing a defect in the fabrication of a composite gas separation module can include the steps of: (a) depositing a first material over a porous substrate, thereby forming a coated substrate, wherein the coated substrate contains at least one defect; (b) selectively surface activating the coated substrate proximate to the defect, thereby forming at least one selectively surface activated region of the coated substrate; and (c) preferentially depositing a second material on the selectively surface activated region of the coated substrate, whereby the defect is cured. By this method, hydrogen gas is at least partially partitioned from the gaseous stream by passing through a dense hydrogen-selective membrane. The dense hydrogen-selective metal membrane can be formed of, for example, palladium or an alloy thereof.

When the composite gas separation module is exposed to a hydrogen gas-containing atmosphere (e.g., a gaseous stream), the dense hydrogen-selective membrane can cause the hydrogen gas to dissociate and diffuse through the membrane. As a result, hydrogen is selectively removed from the hydrogen gas-containing gaseous stream into a volume on the opposite side of the gas separation module. A pressure gradient of hydrogen, wherein the hydrogen partial pressure of the hydrogen gas-containing gaseous stream is greater than the hydrogen partial pressure on the opposite side of the gas separation module, can be maintained to increase the flux of hydrogen through the dense hydrogen-selective metal membrane of the composite gas separation module.

Specific applications for which the composite gas separation module is well-suited include, but are not limited to, hydrogenation/dehydrogenation reactions, methane/steam reforming reactions, and other steam reforming reactions or autothermal reforming of methane. In one embodiment, the present invention includes the step of reacting hydrogen gas-producing reactants to produce the gaseous stream from which hydrogen gas is at least partially partitioned.

In dehydrogenation reactions, the reaction products include hydrogen gas. Reactants, at least one of which includes molecularly-bound hydrogen, can be placed surrounding, between or within composite gas separation modules as described herein. As the reaction proceeds, hydrogen gas can be removed by the composite gas separation module from the volume wherein the reactants react. Since these reactions are generally thermodynamic equilibrium controlled, the reaction can be limited by the accumulation of hydrogen gas and the reaction reaches equilibrium when a sufficient quantity of hydrogen has accumulated. When hydrogen is separated from the reactants, however, conversion can reach 95% or more. In a methane/steam reforming, methane and steam can be passed through or around a tubular composite gas separation module in the presence of a catalyst. The methane and steam react to produce carbon dioxide and hydrogen, and the hydrogen can be dissociated through the dense hydrogen-selective metal membrane and thereby separated from the other gases.

Details of specific method steps that can be employed in various embodiments of the invention follow under separate subheadings.

Substrate Surface Treatments

The present inventive methods can also include surface treating the porous substrate to form an optional intermediate layer prior to depositing the first material over the porous substrate. In one embodiment, the method further includes the step of oxidizing the surface of the porous substrate prior to depositing the first material over the porous substrate. The methods can include the step of forming a ceramic coating on the surface of the porous substrate prior to depositing the first material over the porous substrate. In one embodiment, a metal present at the porous substrate surface is oxidized to form an intermediate layer. Thus, the metal present at the substrate surface is transformed into an oxidized state, bonded to the substrate. In another embodiment, a material is deposited on the surface of the porous substrate and is subsequently oxidized prior to depositing the first material over the porous substrate. In other embodiments, a nitride layer can be formed on the surface of the porous substrate prior to depositing the first material on the porous substrate, for example, by oxidizing the substrate in an ammonia-bearing or nitrogen-based atmosphere or a carbide intermediate layer can be formed, for example, by oxidizing the porous substrate in an atmosphere comprising hydrocarbon gases. To enhance the stability of the composite gas separation module, particularly where it will be used at high temperatures, an optional intermediate layer can further include a coating of a second protective layer, such as a layer of alumina, silica, mullite, cordierite, zirconia, titania, tantalum oxide, tungsten or magnesium oxide.

After surface treating the porous substrate to form an optional intermediate layer, the first material, for example, a hydrogen-selective metal such as palladium or an alloy thereof (e.g., a palladium/sliver alloy or a palladium/copper alloy), can be deposited over the porous substrate. Composite gas separation modules having an intermediate layer and methods of surface treating a substrate to form an intermediate layer are described in U.S. Pat. No. 6,152,987 issued on Nov. 28, 2000, to Ma, et al., the entire contents of which is incorporated herein by reference.

Intermetallic Diffusion Barrier

The inventive methods described herein can also include forming an intermetallic diffusion barrier on the porous substrate prior to depositing the first material over the porous substrate. In one embodiment, forming an intermetallic diffusion barrier (e.g., an oxide layer intermetallic diffusion barrier) includes oxidizing the substrate in situ as described under the heading Substrate Surface Treatments, supra. In another embodiment, an intermetallic diffusion barrier includes one or more layers of deposited metal. For example, applying a porous metal layer intermetallic diffusion barrier can include applying one or more porous layers of metal over the surface of the porous substrate.

In one embodiment, a porous metal layer intermetallic diffusion barrier includes palladium or an alloy thereof and a Group IB metal, such as copper or silver, or an alloy thereof. For example, the intermetallic diffusion barrier can include alternating porous layers of palladium and a Group IB metal or alloys thereof. Methods for fabricating composite gas separation modules that include intermetallic diffusion barriers are further discussed in U.S. Provisional Patent Application No. 60/457,061, entitled "Method of Making Intermetallic Diffusion Barrier," by Ma, et al., filed on Mar. 21, 2003, and in U.S. patent application Ser. No. 10/804,846, entitled "Composite Gas Separation Modules Having Intermediate Porous Metal Layers," by Ma, et al., filed on Mar. 19, 2004, each incorporated by reference herein in their entirety.

Metal Deposition on the Porous Substrate

The present inventive methods for forming a composite gas separation module can also include depositing a metal selected from the group consisting of palladium, gold and platinum on the porous substrate prior to depositing the first material over the porous substrate. Preferably, this deposit of metal on the porous substrate does not significantly increase the transport resistance of the substrate. In one embodiment, the thickness of this metal deposit is less than about 10, 7, 5, 3, or less than about 1 percent of the ultimate thickness of the dense gas-selective membrane.

This procedure can include general surface activation of the porous substrate, as described infra, prior to depositing the metal on the porous substrate. This process of depositing a metal selected from the group consisting of palladium, gold and platinum on the porous substrate can help to protect the substrate from post-synthesis corrosion. In one embodiment, the deposition of palladium, gold and/or platinum on the porous substrate is made following formation of an intermetallic diffusion barrier such as an oxide layer intermetallic diffusion barrier, described supra. The deposition of palladium, gold and/or platinum can also be made prior to formation of an intermetallic diffusion barrier such as the porous metal layer intermetallic diffusion barrier described supra.

In one embodiment, a small quantity of the metal, sufficient to cover the pore walls of the substrate, is deposited on the porous substrate without a significant reduction of the substrate porosity. Typically, the deposition of palladium, gold and/or platinum on the porous substrate is made by surface activating and plating the metal onto the side of the substrate opposite to the side on which a gas-selective membrane will be formed (e.g., on the substrate-side). For example, in one embodiment, a deposit of palladium, gold and/or platinum is formed from the inside of a substrate tube (e.g., from the substrate-side using an electroless plating solution) and a dense gas-selective membrane is subsequently formed on the outside of the substrate tube (e.g., the membrane-side).

Surface Activation (General and Selective Surface Activation)

The present inventive methods can include surface activating a support prior to depositing a desired material (e.g., the first or second materials, an intermetallic diffusion barrier component or a metal deposited on the porous substrate). The porous substrate can be generally surface activated prior to depositing the first material. The coated substrate can be selectively surface activated proximate to the defect. A coated substrate containing at least one defect that has been cured as described herein can be generally surface activated prior to depositing the additional materials (e.g., gas-selective materials) or can be selectively surface activated proximate to other defects.

As described supra, surface activation includes deposition of one or more materials on a surface to encourage deposition of one or more subsequently applied materials. In one embodiment, metal nuclei, such as palladium nuclei, are deposited on a surface to encourage deposition of subsequently applied material (e.g., the first or second materials). For example, a liquid activation composition, described infra, can be used to deposit metal nuclei on a surface.

In one embodiment, a surface activated support is plated using electroless plating. Without wishing to be held to any particular theory, it is believed that when a surface activated support is electrolessly plated, palladium nuclei on the surface activated substrate can initiate, in the presence of a reducing agent such as hydrazine, an autocatalytic process of reducing a metastable palladium salt complex on the surface.

In one embodiment, the support is surface activated by treating it with liquid activation compositions such as, for example, aqueous stannous chloride ($SnCl_2$) and palladium chloride ($PdCl_2$). In one embodiment, the support is surface activated to seed substantially all of the surfaces of the support with nuclei of a hydrogen-selective metal, e.g., palladium. For example, the support can be surface activated by first immersing it in the aqueous acidic $SnCl_2$ bath (e.g., an about 1 g/L aqueous $SnCl_2$ bath) for a suitable time, such as about five minutes, to sensitize the support. Then, the support can be immersed for a suitable time, such as about five minutes, in an aqueous acidic $PdCl_2$ bath (e.g., an about 0.1 g/L aqueous $PdCl_2$ bath) to seed the support with palladium nuclei. The temperature of each bath is typically about 15° C. to about 25° C., for example, about 20° C. Ordinarily, after each immersion in the $SnCl_2$ bath, the support is rinsed with water, for example, deionized water. Typically, after each immersion in the $PdCl_2$ bath, the support is rinsed first with hydrochloric acid, preferably dilute hydrochloric acid, for example, 0.01 M hydrochloric acid, and then with water. Rinsing with hydrochloric acid can be used to prevent hydrolysis of the palladium ions.

During rinsing, after immersion of the support in the acidic stannous chloride bath, stannous ions on the surface of the support can be partially hydrolyzed to form relatively-insoluble products, for example, $Sn(OH)_{1.5}Cl_{0.5}$ and other more complicated hydroxyl-chlorides. The products of hydrolysis can be strongly attached to the surface as a layer having a thickness on the order of a few angstroms. The composition, structure, and thickness of this layer can depend on factors such as the ratio of hydrochloride to stannous chloride, the structure, roughness and shape of the support surface, and the hydrodynamic regime of rinsing. This layer is thought to reduce the $Pd^{2+}$ ions from the $PdCl_2$ bath to $Pd^0$ to form the nuclei or seeds on the surface of the support.

Generally, the above-described process of treating the support with $SnCl_2$ and then with $PdCl_2$ is repeated as necessary to provide a surface activated support. The exact number of repetitions of treatment with $SnCl_2$ and then with $PdCl_2$ depends on the intensity of surface activation that is desired. Typically, the treatment with $SnCl_2$ and then with $PdCl_2$ is preformed at least one time such as about 2 to about 10 times or, preferably, about 2 to about 5 times. In one preferred embodiment, the surface activated support has a uniform dark-brown color and a smooth surface.

Thus, the surface activated support can include a structure having a number of thin layers of palladium nuclei, each formed after performing a surface activation process (such as by treating the support with $SnCl_2$ and then with $PdCl_2$). These preseeded palladium nuclei can reduce the induction period of the autocatalytic process at the start of electroless palladium plating.

While the surface activation of a support using palladium nuclei has been illustrated above, methods for forming surface activated supports suitable for the plating of other metals are well-known to those of ordinary skill in the art.

Alternatively, a metal or alloy (e.g., palladium or alloy thereof) can be deposited on a support without general surface activation of the support. However, absent surface activation, plating of the support with the metal can be slow.

The present inventive methods include selectively surface activating the coated substrate proximate to the defect contained therein. Selective surface activation includes, for example, depositing metal nuclei on a surface in a targeted or tailored manner. For example, in one embodiment, selectively surface activating the coated substrate proximate to the defect includes depositing metal nuclei proximate to the defect (e.g., within the defect), but not generally over the membrane-side of the support.

In one embodiment, a liquid activation composition as described supra can be applied only from a first side of the coated substrate (e.g., the substrate-side), thereby forming at least one selectively surface activated region of the coated substrate, while not substantially surface activating a second side of the plated substrate (e.g., the membrane-side).

Metal Deposition

Deposition of a material on a support can include plating the support with a metal (e.g., a hydrogen-selective metal). For example, depositing a metal on a support, such as depositing a metal over a porous substrate, preferentially depositing a metal on a selectively surface activated region, and/or forming a porous metal layer intermetallic diffusion barrier, can employ an electroless plating technique such as the method that follows.

In one embodiment, plating is conducted by electroless plating. For example, palladium deposition can occur according to the autocatalytic reactions of Chemical Equations I and II:

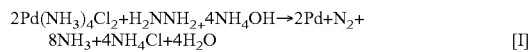

$$2Pd(NH_3)_4Cl_2 + H_2NNH_2, 4NH_4OH \rightarrow 2Pd + N_2 + 8NH_3 + 4NH_4Cl + 4H_2O \quad [I]$$

or

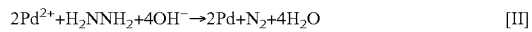

$$2Pd^{2+} + H_2NNH_2 + 4OH^- \rightarrow 2Pd + N_2 + 4H_2O \quad [II]$$

In one embodiment, a plating solution is prepared that contains the following: 4.0 g/L Pd(NH$_3$)$_4$Cl$_2$.H$_2$O; 198 mL/L NH$_4$OH (28%); 40.1 g/L Na$_2$EDTA; and 5.6–7.6 mL/L H$_2$NNH$_2$ (1 M). This plating solution can be maintained at a temperature from about 20° C. to about 90° C. such as, for example, about 60° C. Typically, the plating solution has a pH of approximately 10.4 and is provided in a quantity sufficient to provide approximately 3.5 cm$^3$ of solution per square centimeter of plating area.

The plating solution can be contained in a plating vessel which can be jacketed to provide temperature control. For example, the plating vessel can be kept in a temperature controlled water bath. The support is typically introduced to the plating solution to begin deposition of the palladium.

After about one hour of steady-state deposition of palladium onto the support, the plating activity decreases with a depletion of palladium ions and hydrazine (H$_2$NNH$_2$) and a decrease in the pH of the plating solution. After depletion of the plating solution, a new solution can be provided and the procedure repeated. A stable high rate of deposition for each plating can be achieved not only by changing the plating solution, but also by carefully rinsing the deposited metal between platings. Typically, the deposited metal is rinsed a minimum of about five times, e.g., with deionized water at about 50° C. to about 60° C. for about 2 to about 5 minutes.

In one embodiment, the porous substrate has a first side (e.g., the substrate-side) and a second side (e.g., the membrane-side) and preferentially depositing a metal on the selectively surface activated region of the coated substrate includes plating the metal on to the selectively surface activated region from the second side (e.g., the membrane-side) of the porous substrate. For example, the metal can be preferentially deposited on the selectively surface activated region by applying an electroless plating solution to the membrane-side of the porous substrate.

As alternatives to electroless plating, a metal, e.g., palladium, can be deposited on the support by other suitable metal deposition techniques known in the art, such as thermal deposition, chemical vapor deposition, electroplating, spray deposition, sputter coating, e-beam evaporation, ion beam evaporation or spray pyrolysis. Metal deposition on the porous substrate, described supra, and/or formation of an intermetallic diffusion barrier can also employ these other suitable metal deposition techniques.

Abrasion of a Deposited Material

In one embodiment, the present invention includes the further step of abrading a deposited material. In one embodiment, depositing the first material over the porous substrate includes depositing a first component over the porous substrate, abrading the deposited first component, and then depositing a second component over the abraded, deposited first component. In another embodiment, the inventive methods described herein can include abrading the coated substrate prior to selectively surface activating the coated substrate proximate to the defect.

Methods for fabricating composite gas separation modules that include abrading a deposited material are further discussed in U.S. Provisional Patent Application No. 60/456,930, entitled "Method for Producing Dense Selective Layers," by Ma, et al., filed on Mar. 21, 2003, and in U.S. patent application Ser. No. 10/804,847, entitled "Method for Fabricating Composite Gas Separation Modules," by Ma, et al., filed on Mar. 19, 2004, each incorporated by reference herein in their entirety.

Reacting Chloride to Form Phosphate

A surface activated support, a coated substrate, or other intermediate products described herein can contain chloride anions. Residual metal chlorides, resulting from surface activation or electroless plating steps, can remain in the pores of the support. In one embodiment, the invention includes removing residual metal chlorides, for example, by treatment with an aqueous phosphoric acid solution, e.g., 10% phosphoric acid solution. For example, the treatment can include application of 10% phosphoric acid solution at room temperature for a time sufficient to convert residual metal chlorides to metal phosphates, e.g., about 30 minutes, followed by appropriate rinsing and drying, e.g., rinsing with deionized water for about 30 minutes and drying at about 120° C. for at least about 2 hours.

Therefore, the present inventive methods can further comprise the step of reacting chloride anions to form metal phosphates. For example, residual metal chlorides can be removed between depositions of composite gas separation module components such as deposition of the first material over the porous substrate or preferential deposition of the second material. Treatment with an aqueous phosphoric acid solution can promote exchange of chloride anions to form insoluble metal phosphates. The removal of metal chlorides from the pores can reduce or substantially eliminate corrosion of the support during subsequent plating steps and post-synthesis. In addition, the formed metal phosphates can be more stable than metal chlorides in a dense hydrogen-selective metal membrane at high temperatures. This additional method step can retard the formation of metal chlorides in the support as well as retard the formation of metal chlorides used in electroless plating solutions and activation compositions.

Composite gas separation modules and methods for their fabrication suitable for use in conjunction with the present invention are described in U.S. Pat. No. 6,152,987, cited supra, and also in U.S. Provisional Patent Application No. 60/456,931, entitled "Method of Producing Thin Palladium and Palladium Alloy Layers," by Ma, et al., filed on Mar. 21, 2003; U.S. Provisional Patent Application No. 60/457,061, cited supra; U.S. Provisional Patent Application No. 60/456,930, cited supra; U.S. Provisional Patent Application No. 60/467,493, entitled "High Melting Point Metal Diffusion Barriers for Composite Palladium Porous Stainless Steel Membranes," by Ma, et al., filed on May 2, 2003; U.S. patent application Ser. No. 10/804,846, entitled "Composite Gas Separation Modules Having Intermediate Porous Metal Layers," by Ma, et al., cited supra; and U.S. patent application Ser. No. 10/804,847, entitled "Method for Fabricating Composite Gas Separation Modules," by Ma, et al., cited supra, each of which is incorporated herein by reference in its entirety.

EXEMPLIFICATION

The invention will now be further and specifically described by the following examples which are not intended to be limiting.

Example 1

This example describes the fabrication of a composite palladium/porous stainless steel structure using a 0.1 micron grade porous 316L stainless steel ("PSS") support.

A 6 inch long, 1 inch outside diameter ("O.D."), section of PSS tube, welded to sections of 1 inch O.D. dense, non-porous 316L stainless steel tube on each end, was obtained from Mott Metallurgical Corporation. Contaminants were removed by cleaning the tube in an ultrasonic bath with alkaline solution at 60° C. for one half hour. The tube was then sequentially rinsed using tap water, deionized water and isopropanol.

The tube was oxidized in static air at 400° C. for 10 hours, wherein the rate of heating and cooling was 3° C. per minute. The oxidized tube was then surface activated by sequentially immersing the tube in baths of $SnCl_2$ and $PdCl_2$. The tube was then generally surface activated by sequentially immersing the tube in aqueous baths of $SnCl_2$ and $PdCl_2$. The tube was immersed in 500 mL of aqueous $SnCl_2$ (1 g/L) at 20° C. for about 5 minutes and was subsequently rinsed with deionized water. The tube was then immersed in 500 mL of aqueous $PdCl_2$ (0.1 g/L) at 20° C. for about 5 minutes followed by rinsing first with 0.01 molar hydrochloric acid and then with deionized water. The above-described general surface activation cycle was performed a total of five times followed by drying for 2 hours at 120° C.

Palladium layers were deposited on the tube by electroless plating according to the following procedure. The tube was immersed in a plating solution at room temperature. The plating solution was composed of 4 grams $Pd(NH_3)_4Cl_2H_2O$ liter, 198 milliliters $NH_4OH$ (28 weight percent)/liter, 40.1 grams $Na_2EDTA$/liter, and 6 milliliters $H_2NNH_2$ (1 M)/liter. The plating solution and tube were placed in a water bath at 60° C. After the plating solution was depleted, the tube was removed and rinsed with deionized water at 60° C. with 4 to 5 rinses.

This about 90 minute plating procedure was performed a total of four times (a total time of about 6 hours), each time using a new plating solution. The above-described general surface activation cycle was performed again for a total of three times and the plating procedure was performed a total of three more times (a total time of about 4.5 hours), each time using a new plating solution. Thus, the deposited membrane become sufficiently tight to prevent the flow of plating solutions to the inside of the tube during plating.

Helium flux was measured across the membrane thus formed. These measurements indicated that the membrane was not gas tight.

Defects (e.g., pores) present in the tube were then selectively surface activated from the inside of the tube. Aqueous solutions of $SnCl_2$ (1 g/L) and $PdCl_2$ (0.1 g/L) were sequentially supplied to the inside surface of the tube. The inside of the tube was filled with the $SnCl_2$ solution at 20° C. for about 5 minutes followed by subsequent rinsing with deionized water. The tube was then filled with the $PdCl_2$ solution at 20° C. for about 5 minutes followed by rinsing first with 0.01 molar hydrochloric acid and then with deionized water. This selective surface activation cycle was performed a total of five times followed by drying for 2 hours at 120° C.

The tube was then plated with palladium from the outside of the tube using the palladium plating procedure described supra one time for about 1.5 hours. The tube was then rinsed with deionized water. Immediately after this, and without drying the formed membrane, the tube was plated with palladium one time (1.5 hours) from both sides also using the procedure described above. The tube was then rinsed with deionized water. Following plating, the inside of the tube was treated with a 10% phosphoric acid solution for 15 minutes and then rinsed with deionized water and thoroughly dried at 120° C.

The membrane was finished by performing three cycles of surface activation followed by palladium plating (as described above, a total of three times for a total time of about 4.5 hours, each time using a new plating solution) on the exterior surface of the tube to produce a gas tight palladium covering layer. The tube was rinsed with deionized water following each cycle of palladium plating. Finally, the membrane was thoroughly dried at 120° C.

Based on gravimetric data, the total palladium thickness of the finished membrane was 19.5 microns. The finished membrane was significantly thinner than the palladium membrane produced as described in Example 4.

Example 2

This example describes the fabrication of a composite palladium/porous stainless steel structure using a 0.1 micron grade porous 316L stainless steel ("PSS") support.

A 6 inch long, 1 inch O.D., section of PSS tube, welded to sections of 1 inch O.D. dense, non-porous 316L stainless steel tube on each end, was obtained from Mott Metallurgical Corporation. Contaminants were removed by cleaning the tube in an ultrasonic bath with alkaline solution at 60° C. for one half hour. The tube was then sequentially rinsed using tap water, deionized water and isopropanol.

The tube was oxidized in static air at 400° C. for 12 hours wherein the rates of heating and cooling were 3° C. per minute. The oxidized tube was then generally surface activated by sequentially immersing the tube in aqueous baths of $SnCl_2$ and $PdCl_2$. The tube was immersed in 500 mL of aqueous $SnCl_2$ (1 g/L) at 20° C. for about 5 minutes and was subsequently rinsed with deionized water. The tube was then immersed in 500 mL of aqueous $PdCl_2$ (0.1 g/L) at 20° C. for about 5 minutes followed by rinsing first with 0.01 molar hydrochloric acid and then with deionized water. The above-described general surface activation cycle was performed a total of five times followed by drying for 2 hours at 120° C.

An intermediate porous metal layer of palladium and silver was then applied to the surface activated tube. Thin layers of palladium (Pd) and silver (Ag) were sequentially deposited using electroless plating as described below.

Palladium layers were deposited on the tube by electroless plating according to the following procedure. The tube was immersed in a plating solution at room temperature. The plating solution was composed of 4 grams $Pd(NH_3)_4Cl_2 \cdot H_2O$/liter, 198 milliliters $NH_4OH$ (28 weight percent)/liter, 40.1 grams $Na_2EDTA$/liter, and 6 milliliters $H_2NNH_2$ (1 M)/liter. The plating solution and tube were placed in a water bath at 60° C. After the plating solution was depleted, the tube was removed and rinsed with deionized water at 60° C. with 4 to 5 rinses.

Silver layers were deposited on the tube by electroless plating according to the following procedure. The tube was immersed in a plating solution at room temperature. The plating solution was composed of 0.519 grams $AgNO_3$/liter, 198 milliliters $NH_4OH$ (28 weight percent)/liter, 40.1 grams $Na_2EDTA$/liter, and 6 milliliters $H_2NNH_2$ (1 M)/liter. The plating solution and tube were placed in a water bath at 60° C. After the plating solution was depleted, the tube was removed and rinsed with deionized water at 60° C. with 4 to 5 rinses.

Each metallic layer was applied by contacting the tube with a plating solution for 90 minutes and was followed by rinsing the tube with deionized water, but not with intermediate activation, drying or sintering. The specific layers, an estimate of the layer thicknesses, and the order of their application were Pd (about 1.5 microns), Ag (about 0.3 microns), Pd (about 1 micron), Ag (about 0.3 microns), and Pd (about 1.5 microns) (a total of five layers). (Thickness estimates were based on time of contact with the plating solutions. The average rate of metal deposition was determined for a test piece of a similar support and the identical plating solution and activation procedure. The test pieces were activated, then plated for 90 minutes and then rinsed, dried and weighed. From that it was possible to estimate the thickness which was deposited over 90 minutes.) After applying the above-described palladium and silver layers, the membrane was dried at 120° C. for about 48 hours. Helium flux was measured across the membrane thus formed. These measurements indicated that the membrane was not gas tight at this point.

The membrane surface was then lightly brushed with a fine artist's paint brush. Following this brushing, the entire plated surface of the tube was dipped in 0.1M HCL for 60 seconds at room temperature. The membrane was then rinsed with deionized water at room temperature. Then, the membrane was surface activated by repeating the surface activation cycle, described supra, three times. The membrane was then dried at 120° C. overnight.

Palladium was then deposited on the exterior of the tube by electroless plating according to the above-described procedure three times for 90 minutes each time (a total of 4.5 hours). Between each of the 90 minute platings, the membrane was rinsed with deionized water (at 60° C.) not less than three times. After the last plating and rinsing with DI water, the membrane was dried for 2 hours at 120° C.

Defects (e.g., pores) present in the tube were then selectively surface activated from the inside of the tube. Aqueous solutions of $SnCl_2$ (1 g/L) and $PdCl_2$ (0.1 g/L) were sequentially supplied to the inside surface of the tube. The inside of the tube was filled with the $SnCl_2$ solution at 20° C. for about 5 minutes followed by subsequent rinsing with deionized water. The tube was then filled with the $PdCl_2$ solution at 20° C. for about 5 minutes followed by rinsing first with 0.01 molar hydrochloric acid and then with deionized water. This selective surface activation cycle was performed a total of five times followed by drying for 2 hours at 120° C.

The tube was then plated with three layers of palladium from the outside of the tube using the palladium plating procedure described supra. Following this further palladium plating, the inside of the tube was treated with a 10% phosphoric acid solution for about 30 minutes and then rinsed with deionized water and thoroughly dried at 120° C. The processes of surface activating the tube from the inside, plating with palladium from the outside of the tube, and treating with phosphoric acid solution were repeated once.

The membrane was then lightly dry sanded with 2400 grit waterproof sand paper (SILICON CARBIDE, Struers, Inc., Westlake, Ohio). Following this, it was rinsed in acetone with a mild ultrasonic treatment for 15 minutes and then dried overnight at 120° C.

The membrane was then surface activated, as described above, by repeating the general surface activation cycle on the exterior of the tube three times. Palladium was then deposited on the exterior of the tube by electroless plating according to the above-described procedure four times for 90 minutes each time (a total of six hours). Between each of the 90 minute platings, the membrane was rinsed with deionized water (at 60° C.) not less than three times and the plating solution was replaced with a fresh plating solution. Following the final palladium plating, the membrane was rinsed with deionized water and thoroughly dried at 120° C.

Based on gravimetric data, the total palladium and silver thickness of the finished membrane was 24 microns.

The membrane was tested for hydrogen permeation at 500° C. with a 1 atmosphere pressure differential for a cumulative total of 608 hours. During the first 501 hours of continuous testing, the hydrogen permeance measured under these conditions rose from 15.7 to 17.6 normal cubic meters per square meter per hour (reference temperature=0° C., reference pressure=1 atmosphere) ($Nm^3/m^2$-hr) at 24 hours and 501 hours, respectively. The separation factor at the end of the first 501 hour continuous test was estimated to be about 180 based on a helium leak measurement taken at 500° C. at 501 hours. During a second round of testing, no decline in the hydrogen permeance was observed for an additional 107 hours of testing. The membrane was observed to obey Sievert's law at 373, 449, and 498° C. for flux measurements taken with a pressure difference between 0.25 and 2.7 atmospheres. Thus, under these conditions, hydrogen permeation was limited by the diffusion of hydrogen atoms through the palladium. The activation energy obtained from hydrogen permeance measurements taken with a 1 atmosphere pressure difference over the temperature range of 366° C. to 500° C. was 10.9 kJ/mol.

Example 3

This example describes the fabrication of a composite structure comprising palladium, an intermediate porous metal layer (e.g., a porous metal layer intermetallic diffusion barrier), and a 0.1 micron grade porous 316L stainless steel ("PSS") support. A hydrogen selective membrane was formed on a 40 inch long section of 1 inch O.D. PSS using procedures substantially the same as those described in Example 2.

The total palladium and silver thickness of the finished membrane (the total noble metal thickness) was 25.5 microns, determined gravimetrically. The membrane was tested for hydrogen permeation at 450° C. and 500° C. with a 1 atmosphere pressure differential. This membrane had hydrogen permeance of 5.05 $Nm^3/m^2$-hr at 450° C. and 5.67 $Nm^3/m^2$-hr at 500° C. Based on these two permeance measurements, the activation energy was estimated to be about 10.8 kJ/mol.

Example 4

This example describes the fabrication of a composite palladium/porous stainless steel structure using a 0.1 micron grade porous 316L stainless steel ("PSS") support.

A 6 inch long, 1 inch O.D., section of PSS tube, welded to sections of 1 inch O.D. dense, non-porous 316L stainless steel tube on each end, was obtained from Mott Metallurgical Corporation. Contaminants were removed by cleaning the tube in an ultrasonic bath with alkaline solution at 60° C. for one half hour. The tube was then sequentially rinsed using tap water, deionized water and isopropanol.

The tube was oxidized in static air at 400° C. for 10 hours wherein the rates of heating and cooling were 3° C. per minute. The oxidized tube was then generally surface activated by sequentially immersing the tube in aqueous baths of $SnCl_2$ and $PdCl_2$. The tube was immersed in 500 mL of aqueous $SnCl_2$ (1 g/L) at 20° C. for about 5 minutes and was subsequently rinsed with deionized water. The tube was then immersed in 500 mL of aqueous $PdCl_2$ (0.1 g/L) at 20° C. for about 5 minutes followed by rinsing first with 0.01 molar hydrochloric acid and then with deionized water. The above-described general surface activation cycle was performed a total of five times followed by drying for 2 hours at 120° C.

Palladium was then deposited on the tube by electroless plating according to the following procedure. The tube was immersed in a plating solution at room temperature. The palladium plating solution was composed of 4 grams $Pd(NH_3)_4Cl_2 \cdot H_2O$/liter, 198 milliliters $NH_4OH$ (28 weight percent)/liter, 40.1 grams $Na_2EDTA$/liter, and 6 milliliters $H_2NNH_2$ (1 M)/liter. The plating solution and tube were placed in a water bath at 60° C. After the plating solution was depleted (usually after about 60 to about 120 minutes), the tube was removed and rinsed with deionized water at 60° C. with 4 to 5 rinses. This plating procedure was performed a total of four times, each time using a new plating solution. The solution contact times for each of the 4 plating solution immersion steps were 60, 90, 90 and 90 minutes, given in the order performed. The total cumulative plating time at the end of these steps was 5.5 hours.

Then, the membrane was dried and the general surface activation cycle was performed a total of three times. Next, the palladium plating procedure was repeated four times (about 90 minute solution contact time for each), and the membrane was dried. The total cumulative plating time for the membrane at the end of these steps was 11.5 hours.

The membrane was then surface activated with three surface activation cycles followed by five 120-minute platings of palladium and then this surface activation and plating were repeated. The total plating time was 31.5 hours. The average plating rate was about 1.1 microns of palladium thickness per hour of plating. During the palladium plating, the deposited membrane become sufficiently tight to prevent the free flow of gas across the membrane. Helium flux was measured across the membrane thus formed. These experiments indicated that the membrane became gas tight at a gravimetrically determined palladium thickness of 34.9 microns.

While this invention has been particularly shown and described with references to preferred embodiments thereof, it will be understood by those skilled in the art that various changes in form and details may be made therein without departing from the scope of the invention encompassed by the appended claims.

We claim:

1. A method for curing a defect in the fabrication of a composite gas separation module, comprising the steps of:
   a) depositing a first gas-selective material over a porous substrate to form a coating on the substrate, thereby forming a coated substrate, wherein the coated substrate contains at least one defect;
   b) selectively surface activating the coated substrate proximate to the defect by forming a layer on the coated substrate at the defect that chemically reduces a gas-selective metal component of a liquid activation composition, and subsequently applying the liquid activation composition to the layer, thereby forming at least one selectively surface activated region of nuclei on the coated substrate, said nuclei including the gas-selective metal; and
   c) preferentially depositing a second material on the selectively surface activated region of the coated substrate, whereby the defect is cured.

2. The method of claim 1 wherein at least one of the first material and the second material includes a gas-selective material.

3. The method of claim 2 wherein both the first material and the second material include a gas-selective material.

4. The method of claim 2 wherein the gas-selective material is a hydrogen-selective metal or an alloy thereof.

5. The method of claim 4 wherein the hydrogen-selective metal is palladium or an alloy thereof.

6. The method of claim 5 wherein the hydrogen-selective metal is palladium alloyed with at least one of the metals selected from the group consisting of copper, silver, gold, platinum, ruthenium, rhodium, yttrium, cerium and indium.

7. The method of claim 1 wherein depositing the first material over the porous substrate includes depositing an alloy over the porous substrate or on the selectively surface activated region, and wherein depositing an alloy includes applying at least two metals over the porous substrate and thermally treating the metals to form the alloy.

8. The method of claim 1 wherein the first material includes a zeolite.

9. The method of claim 1 wherein depositing the first material over the porous substrate includes the step of depositing a hydrogen-selective metal component over another component of the first material that is not hydrogen-selective prior to selectively surface activating the coated substrate proximate to the defect.

10. The method of claim 1 further including the step of surface activating the porous substrate prior to depositing the first material.

11. The method of claim 1 further including the step of depositing a metal selected from the group consisting of palladium, gold and platinum on the porous substrate prior to depositing the first material.

12. The method of claim 1 further including the step of forming an intermetallic diffusion barrier on the porous substrate prior to depositing the first material.

13. The method of claim 12 wherein forming an intermetallic diffusion barrier on the porous substrate includes forming a ceramic coating on the surface of the porous substrate.

14. The method of claim 1 wherein depositing the first material over the porous substrate includes depositing the first material by a method selected from the group consisting of electroless plating, electroplating, thermal deposition, chemical vapor deposition, spray deposition, sputter coating, e-beam evaporation, ion beam evaporation and spray pyrolysis.

15. The method of claim 1 wherein the defect includes a pore and selectively surface activating the coated substrate proximate to the defect includes surface activating the pore.

16. The method of claim 1 wherein the step of selectively surface activating the coated substrate proximate to the defect includes selectively seeding the coated substrate proximate to the defect with nuclei of a gas-selective metal.

17. The method of claim 16 wherein a liquid activation composition is used to selectively seed the coated substrate proximate to the defect with nuclei of a gas-selective metal.

18. The method of claim 17 wherein the first material is deposited over the porous substrate in an amount sufficient to impede flow of a liquid activation composition from a first side of the coated substrate to a second side of the coated substrate.

19. The method of claim 17 wherein the first material is deposited over the porous substrate in an amount sufficient to substantially prevent flow of a liquid activation composition from the first side of the coated substrate to the second side of the coated substrate.

20. The method of claim 17 wherein the first material is deposited over the porous substrate in an amount sufficient to substantially prevent emergence of the liquid activation composition, applied from the first side of the coated substrate, from the defect and onto the second side of the coated substrate.

21. The method of claim 1 wherein the porous substrate has a first side and a second side, wherein selectively surface activating the coated substrate proximate to the defect includes surface activating the coated substrate proximate to the defect from the first side of the porous substrate, and wherein preferentially depositing the second material on the selectively surface activated region of the coated substrate includes depositing the second material on the selectively surface activated region from the second side of the porous substrate.

22. The method of claim 1 wherein preferentially depositing the second material on the selectively surface activated region of the coated substrate includes depositing the second material by electroless plating.

23. The method of claim 1 wherein the first material includes a first component and a second component and wherein the step of depositing the first material over the porous substrate includes the steps of:
 a) depositing the first component over the porous substrate, thereby forming a first component-coated substrate, wherein the first component-coated substrate contains at least one defect;
 b) selectively surface activating the first component-coated substrate proximate to the defect, thereby forming at least one selectively surface activated region of the first component-coated substrate; and
 c) preferentially depositing the second component on the selectively surface activated region of the first component-coated substrate.

24. The method of claim 23 wherein the first material further includes a third component and the method further includes the step of depositing the third component over the second component, thereby forming the coated substrate.

25. The method of claim 23 wherein at least one of the first component and the second component includes a gas-selective material.

26. The method of claim 1 wherein a dense gas-selective membrane is formed over the porous substrate.

27. The method of claim 26 wherein the dense gas-selective membrane includes palladium or an alloy thereof.

28. The method of claim 1 wherein the porous substrate is a porous metal substrate.

29. The method of claim 28 wherein the porous metal substrate is an alloy containing chromium and nickel.

30. The method of claim 29 wherein the alloy further contains molybdenum.

31. The method of claim 28 wherein the porous metal substrate is stainless steel.

32. The method of claim 1 wherein the porous substrate is a porous ceramic substrate.

33. A composite gas separation module fabricated by a process that includes the method of claim 1.

34. The composite gas separation module fabricated by a process that includes the method of claim 26 wherein the thickness of the dense gas-selective membrane is less than about three times the diameter of the largest pore of the porous substrate.

35. The composite gas separation module of claim 34 wherein the dense gas-selective membrane includes palladium or an alloy thereof.

36. The composite gas separation module of claim 34 wherein the thickness of the dense gas-selective membrane is less than about 14 microns in thickness.

37. A method for selectively separating hydrogen gas from a hydrogen gas-containing gaseous stream, comprising the step of directing the hydrogen gas-containing gaseous stream to a composite gas separation module formed by a process that includes the method of claim 1, whereby hydrogen gas is at least partially partitioned from the gaseous stream by passing through a dense hydrogen-selective metal membrane.

38. The method of claim 37 further including the step of reacting hydrogen gas-producing reactants to produce the gaseous stream.

39. The method of claim 37 wherein the dense hydrogen-selective metal membrane includes palladium or an alloy thereof.

40. A method for fabricating a plated substrate, comprising the steps of:
 a) plating a first gas-selective metal over a porous substrate to form a coating on the substrate, thereby forming a coated substrate, wherein the coated substrate contains at least one defect;
 b) selectively surface activating the coated substrate proximate to the defect by forming a layer on the coated substrate at the defect that chemically reduces a gas-selective metal component of a liquid activation composition, and subsequently applying the liquid activation composition to the layer, thereby forming at least one selectively surface activated region of nuclei on the coated substrate, said nuclei including the gas-selective metal; and c) preferentially plating a second metal on the selectively surface activated region of the coated substrate, thereby forming the plated substrate.

41. The method of claim 40 wherein at least one of the first metal and the second metal includes a hydrogen-selective metal or an alloy thereof.

42. The method of claim 41 wherein the hydrogen-selective metal is palladium or an alloy thereof.

43. The method of claim 40 wherein the defect includes a pore and selectively surface activating the coated substrate proximate to the defect includes surface activating the pore.

44. The method of claim 40 wherein the step of selectively surface activating the coated substrate proximate to the defect includes seeding the coated substrate proximate to the defect with nuclei of a gas-selective metal.

45. The method of claim 44 wherein a liquid activation composition is used to selectively seed the coated substrate proximate to the defect with nuclei of a gas-selective metal.

46. The method of claim 45 wherein the first metal is deposited over the porous substrate in an amount sufficient to substantially prevent flow of a liquid activation composition from a first side of the coated substrate to a second side of the coated substrate.

47. The method of claim 40 wherein the porous substrate has a first side and a second side, wherein selectively surface activating the coated substrate proximate to the defect includes surface activating the coated substrate proximate to the defect from the first side of the porous substrate, and wherein preferentially depositing the second metal on the selectively surface activated region of the coated substrate includes depositing the second metal on the selectively surface activated region from the second side of the porous substrate.

48. The method of claim 40 wherein preferentially depositing the second metal on the selectively surface activated region of the coated substrate includes depositing the second metal by electroless plating.

* * * * *